United States Patent [19]

Nomura

[11] Patent Number: 5,459,327

[45] Date of Patent: Oct. 17, 1995

[54] FAR-INFRARED RADIATOR AND METHOD OF RADIATING FAR-INFRARED

[75] Inventor: Harehiko Nomura, Ibaraki, Japan

[73] Assignee: Kabushiki Kaisha Dairin Shoji, Osaka, Japan

[21] Appl. No.: 210,405

[22] Filed: Mar. 18, 1994

[30] Foreign Application Priority Data

Oct. 15, 1993 [JP] Japan .................................. 5-281777

[51] Int. Cl.⁶ .................................................. A61N 5/06
[52] U.S. Cl. .................................. 250/504 R; 250/495.1; 392/408
[58] Field of Search .................... 250/504 R, 495.1; 392/408

[56] References Cited

U.S. PATENT DOCUMENTS 3,702,391   11/1972   Wellnitz et al. ...................... 250/495.1

FOREIGN PATENT DOCUMENTS

| 48-101634 | 12/1973 | Japan . |
| 51-3098 | 1/1976 | Japan . |
| 60-107288 | 6/1985 | Japan . |
| 60-107289 | 6/1985 | Japan . |
| 62-160681 | 7/1987 | Japan . |
| 62-281293 | 12/1987 | Japan . |
| 63-19783 | 1/1988 | Japan . |
| 1-112687 | 5/1989 | Japan . |
| 5-13151 | 1/1993 | Japan . |
| 5-144554 | 6/1993 | Japan . |

OTHER PUBLICATIONS

Theory and Practice of Far-Infrared Heating, edited by Japan Electro=heat Association, Log Wave Infrared Ray Subcommittee, OHMSHA.

Primary Examiner—Jack I. Berman
Attorney, Agent, or Firm—Lowe, Price, LeBlanc & Becker

[57] ABSTRACT

A far-infrared radiator includes carbon fiber mixed paper and an organic compound layer laminated on both sides of the carbon fiber mixed paper. The far-infrared rays are radiated from the front surface and the back surface of the carbon fiber mixed paper by applying current to the carbon fiber mixed paper. The far-infrared rays radiated from the carbon fiber mixed paper cause resonance at a particular wavelength in the organic compound layer and the far-infrared rays in a wavelength range which depends on that wavelength are radiated. The wavelength range of the radiated far-infrared rays can be controlled by selecting the materials for the organic compound layer.

22 Claims, 8 Drawing Sheets

(EMISSIVITY, TEMPERATURE CHARACTERISTICS OF MATERIALS)

FAR-INFRARED RADIATOR AND METHOD OF RADIATING FAR-INFRARED

BACKGROUND OF THE INVENTION

1. Field of the Invention

The present invention relates to a far-infrared radiator and a method of radiating the far-infrared rays for radiating far-infrared rays in a particular wavelength range.

2. Description of the Background Art

Various kinds of heaters have conventionally been developed for heating. Especially, the sheet-like heat generating elements which use the carbon fiber (hereinafter, referred to as a carbon fiber sheet-like heat generating element) have attracted special interest recently as heat generators for radiating the far-infrared rays. The carbon fiber sheet-like heat generating elements are disclosed in Japanese Patent Publication No. 51-3098, Japanese Patent Laying-Open No. 48-101634, Japanese Patent Laying-Open No. 60-107288, Japanese Patent Laying-Open No. 60-107289, Japanese Patent Laying-Open No. 62-160681, Japanese Patent Laying-Open No. 62-281293, Japanese Patent Laying-Open No. 63-19783, Japanese Patent Laying-Open No. 1-112687, Japanese Patent Laying-Open No. 5-13151, and Japanese Patent Laying-Open No. 5- 144554, for example.

Generally, in the carbon fiber sheet-like heat generating elements, the carbon fiber is formed into a plane shape with shaping function material such as resin to stabilize the fiber structure. It is not originally desired to use flammable materials such as resin since the carbon fiber sheet-like heat generating elements generate heat to a high temperature, but those are used unavoidably as plane stabilizing materials for stabilizing the carbon fiber in plane shape. Accordingly, flammable resins are not used as the plane stabilizing material, but resins having heat resistance are selected. The main applications of such carbon fiber sheet-like heat generating elements are heating, so that developments have been widely achieved with a primary view to its heat generating characteristics and electrical characteristics.

As described above, a lot of researches have been made so far on the carbon fiber sheet-like heat generating elements in the aspect of heat generation. However, researches have been hardly made in the aspect of the far-infrared radiators. Such far-infrared radiators are used not only for heating but also used for the thermotherapy. According to the knowledge which an inventor of the present invention has acquired in his study, the far-infrared radiators can also be used for the purposes such as medical treatments which depend on wavelengths of the far-infrared rays. For that purpose, the far-infrared rays in a particular wavelength range must be selectively and efficiently radiated corresponding to the contents of the applications.

The inventor of the present invention has also acquired information that there are far-infrared ray ranges which are peculiar to individual living bodies, organs or systems, but it is not described herein because the present invention is directed to the method and the structure for radiating the far-infrared rays.

SUMMARY OF THE INVENTION

It is an object of the present invention to provide a far-infrared radiator and a method of radiating the far-infrared rays which can efficiently radiate the far-infrared rays in a desired particular wavelength range.

It is another object of the present invention to provide a far-infrared radiator and a method of radiating the far-infrared rays which can control the wavelength of the radiated far-infrared rays.

The inventor of the present invention paid attention to the carbon fiber as a far-infrared ray radiating material not just as a mere heat generating element to enable efficient radiation of the far-infrared rays in a particular wavelength range. Now, the far-infrared rays mean the infrared rays having the wavelength in a range of about 4 μm to about 100 μm (=1 mm) herein.

Figure 1:
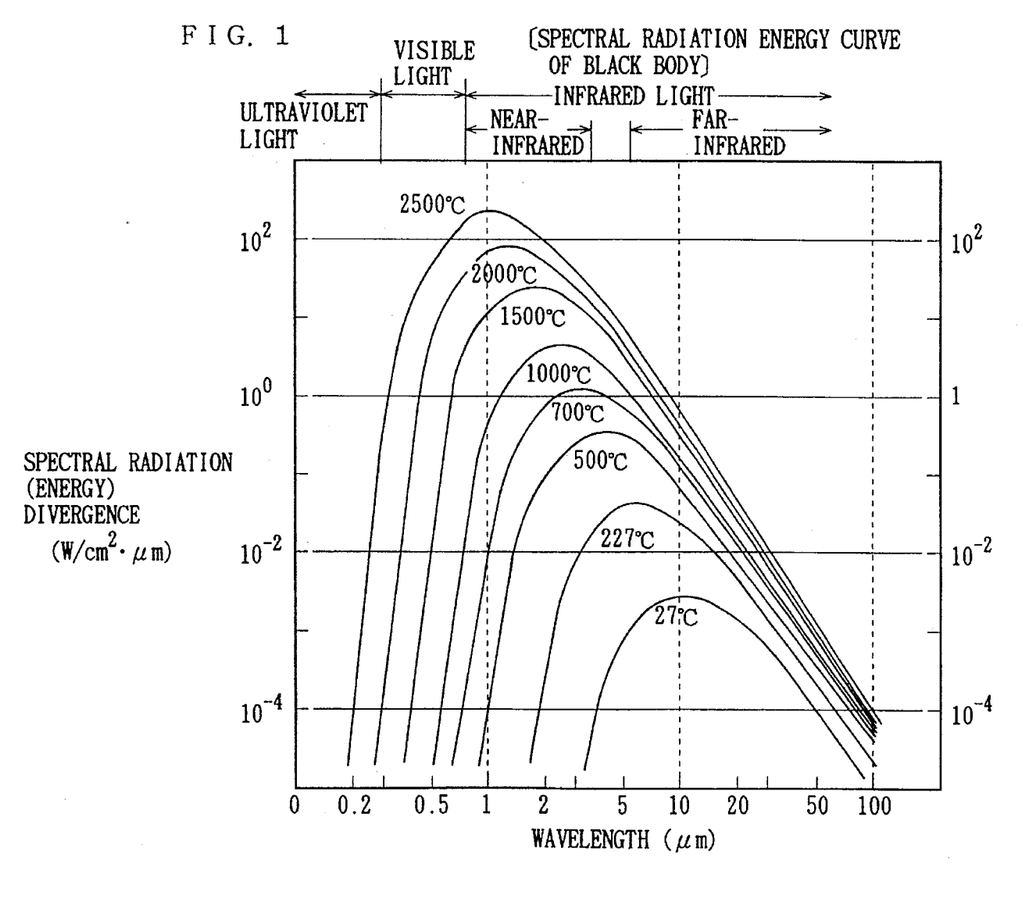
FIG. 1 is a diagram showing a spectral radiation energy curve of a black body.

The spectral radiation energy curve of a black body is shown in FIG. 1. The black body means an imaginary substance which absorbs all the electromagnetic waves radiated from around it ranging all the wavelengths. The black body in the thermal equilibrium state with the outside about radiation emits all the radiant energy received at that temperature to the outside. In other words, the black body has the absorptivity of 1 and the reflectivity of 0 at all the wavelengths. On the other hand, real substances never absorb all the radiated energy by 100% like the black body, where the energy emitted therefrom is smaller than the received radiant energy. As a reference material, *Theory and Practice of Far-infrared Heating (Ensekigai Kanetu No Riron To Jissai)*, edited by Japan Electro-heat Association, Long Wave Infrared Ray Subcommittee, OHMSHA, Japan is cited herein, for example.

As can be seen from FIG. 1, the peaks of the spectral radiation energy of the black body at various temperatures shift to the shorter wavelength side as the temperature increases. The temperature of the black body having the peak in the range of the wavelength of the far-infrared ray (from 4 μm to 100 μm) ranges from the room temperature to about 200° C. at the most. Accordingly, high temperature heating is not required to efficiently radiate the far-infrared rays.

Figure 2:
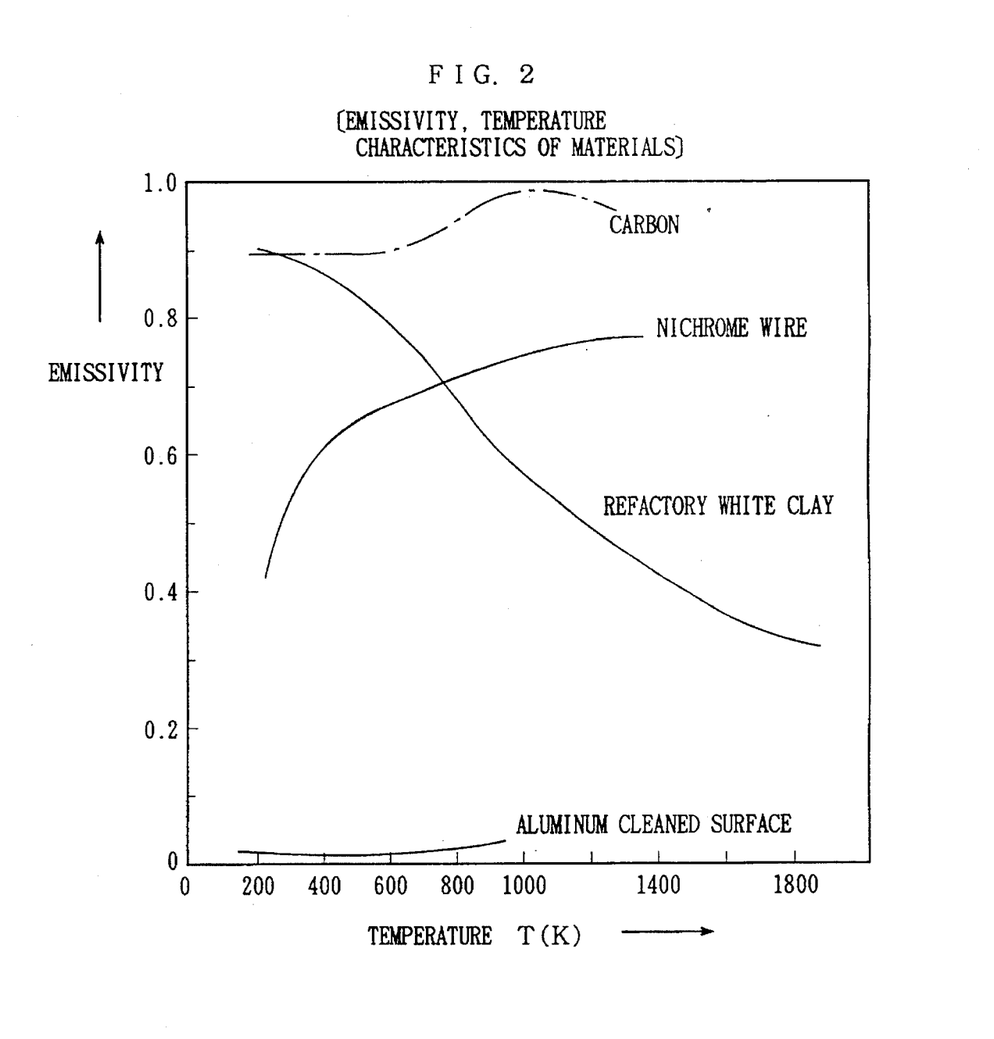
FIG. 2 is a diagram showing temperature characteristics of emissivity of various kinds of materials.

FIG. 2 shows the temperature characteristics of emissivity of various materials. It can be seen from FIG. 2 that the carbon has the largest emissivity in the range from 300K (=27° C.) to 500K (=227° C.). This emissivity of carbon is 0.9, which is very close to the emissivity of the black body, 1.0. This temperature range is a range in which the black body radiates the far-infrared rays most efficiently in the spectral radiation energy curve of the black body shown in FIG. 1. From FIG. 1 and FIG. 2, it is understood that carbon radiates the far-infrared rays most efficiently. That is, materials other than carbon are not efficient as long as the radiation efficiency of the far-infrared ray only is considered.

Next, the inventor of the present invention paid attention to the infrared absorption spectrum of organic compounds concerning selection of far-infrared ray in a particular range. Each organic compound shows infrared absorption spectrum which is peculiar to that organic compound corresponding to the characteristic frequency of its radical.

Figure 3:
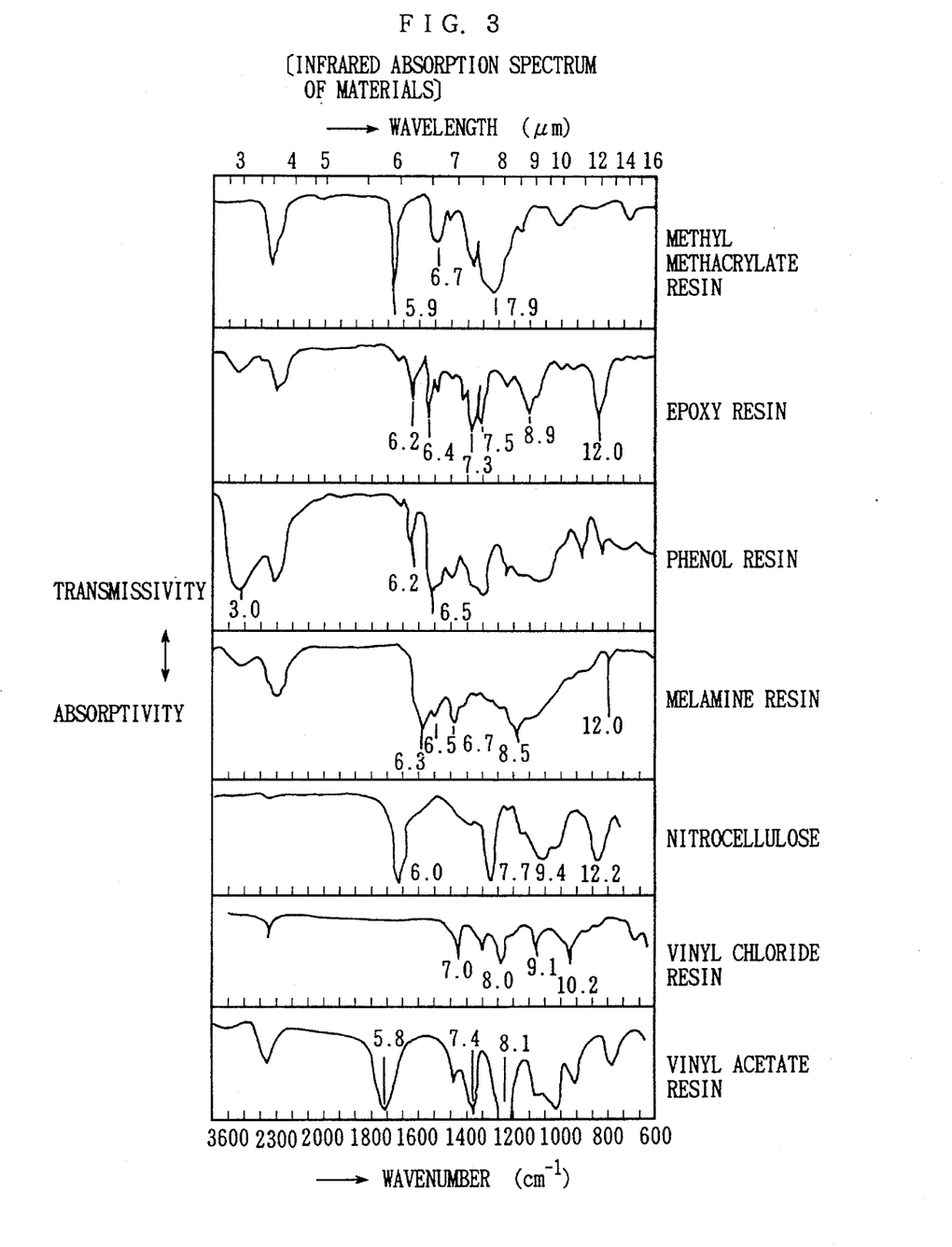
FIG. 3 is a diagram showing the infrared absorption spectrum of various kinds of resins.

FIG. 3 shows an example of the infrared absorption spectrum of various resins. For example, methyl methacrylate resin has absorption peaks of far-infrared ray at the wavelengths 5.9 μm, 6.7 μm and 7.9 μm. The epoxy resin has absorption peaks of infrared ray at the wavelengths 6.2 μm, 6.4 μm, 7.3 μm, 7.5 μm, 8.9 μm and 12.0 μm. In this way, each resin has individual absorption peaks of far-infrared ray.

Figure 4:
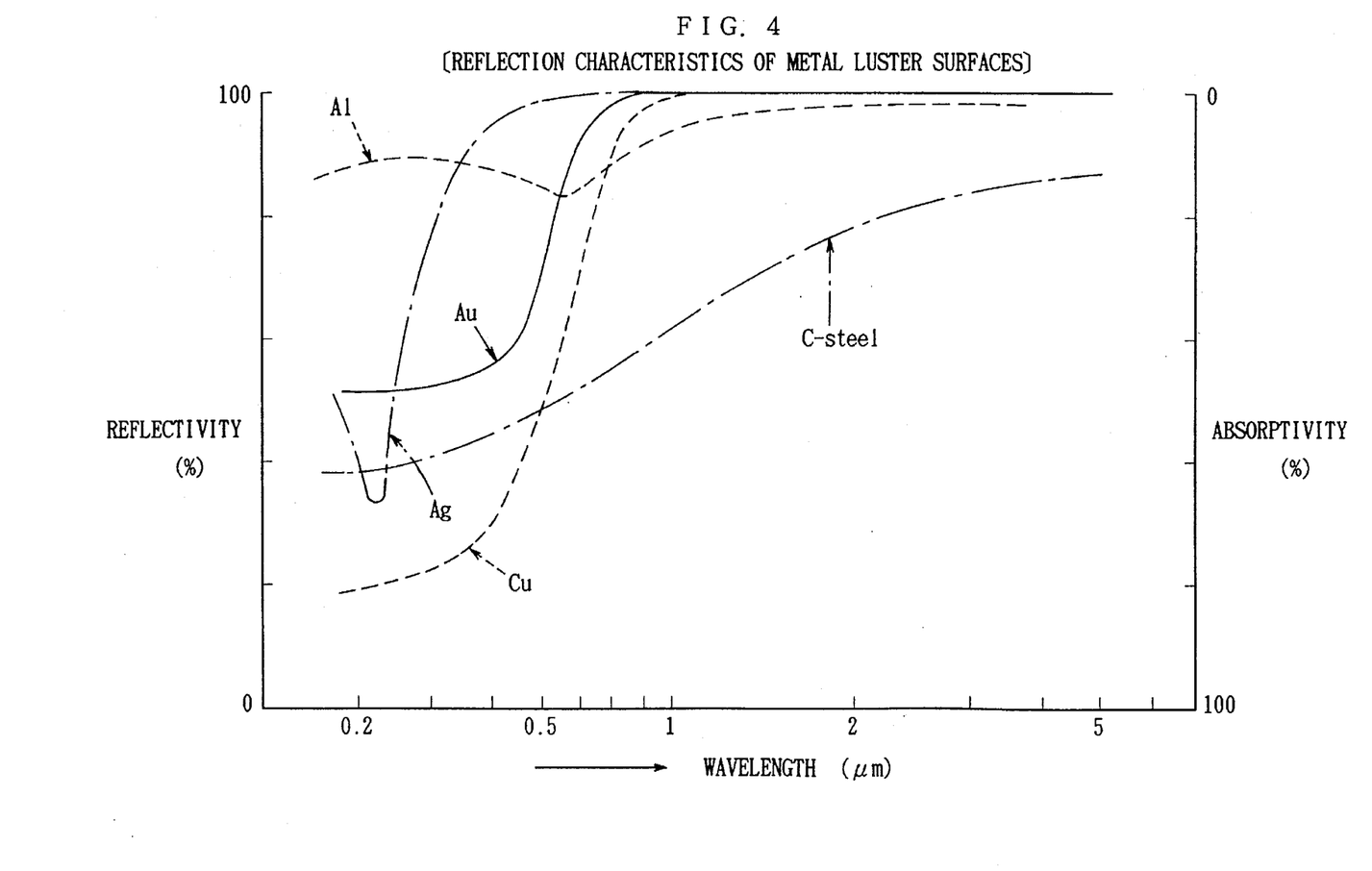
FIG. 4 is a diagram showing the reflection characteristics of various kinds of metal luster surfaces.

When a organic substance has absorbed the far-infrared rays having a certain wavelength, resonance corresponding to the molecular state is caused inside the substance and far-infrared rays in a particular wavelength range are selectively radiated to the outside. That is to say, each substance has ability of radiating far-infrared rays in a wavelength range which depends on the wavelengths at which it has absorption peaks in the far-infrared absorption spectrum. Accordingly, the far-infrared rays having desired wavelengths can be selected by using various kinds of organic compounds as filters. On the other hand, as shown in FIG. 4, metals such as aluminum, copper, silver and gold have reflectivity of almost 100% in the wavelength range of the far-infrared ray. Accordingly, they can not be used as radiating elements for the far-infrared rays.

From the consideration made above, the inventor of the present invention has selected the carbon fiber as a material which most efficiently radiates the far-infrared rays, and has devised the present invention by positively and efficiently using organic compounds for selection of the far-infrared rays in a particular wavelength range.

Now, although physical and physiological reasons of selecting the wavelength of the far-infrared rays are to cause molecular resonance between the far-infrared ray and biostructure and physical structure of the radiated material to input useful energy, the principle thereof will not be described in the description of the present invention.

A far-infrared radiator according to an aspect of the present invention includes a far-infrared ray radiating heat generator including carbon fiber and filter means including an organic compound.

According to the far-infrared radiator, the far-infrared rays can be radiated most efficiently because the far-infrared ray radiating heat generator includes the carbon fiber. Furthermore, a far-infrared ray in a particular wavelength range can be selectively obtained by the filter means including the organic compound.

A far-infrared radiator according to another aspect of the present invention includes a far-infrared radiating heat generator including carbon fiber and wavelength selecting means including an organic compound which absorbs a far-infrared ray having a particular wavelength in far-infrared rays radiated from the far-infrared ray radiating heat generator and selectively radiates a far-infrared ray in a particular wavelength range.

According to the far-infrared radiator, the far-infrared rays can be most efficiently radiated since the far-infrared ray radiating heat generator includes carbon fiber. Also, the far-infrared rays in a particular wavelength range can be selectively radiated by the wavelength selecting means including the organic compound.

A far-infrared radiator according to still another aspect of the present invention includes a far-infrared radiation heat generating layer including carbon fiber mixed paper and a resin layer laminated on the far-infrared radiation heat generating layer for converting far-infrared energy radiated from the far-infrared radiation heat generating layer into a far-infrared ray in a particular wavelength range and radiating.

According to this far-infrared radiator, the far-infrared energy is efficiently radiated by the far-infrared radiation heat generating layer including the carbon fiber mixed paper and the far-infrared energy is converted into a far-infrared ray in a particular wavelength range by the resin layer.

A method of radiating a far-infrared ray according to yet another aspect of the present invention includes the following steps. A far-infrared ray is radiated by a heat generating element including carbon fiber. The radiated far-infrared ray is passed through a certain organic compound so that a far-infrared ray in a wavelength range which depends on the kind of organic compound is selectively radiated.

In this far-infrared ray radiating method, the far-infrared rays are most efficiently radiated by the heat generating element including the carbon fiber, and the far-infrared rays pass through the organic compound so that far-infrared rays in a wavelength range which depends on the kind of organic compound are selectively radiated.

A method of radiating a far-infrared ray according to still another aspect of the present invention includes the following steps. A far-infrared ray is radiated by a heat generating element including carbon fiber. The radiated far-infrared ray is passed though any of a plurality of kinds of organic compounds to selectively radiate a far-infrared ray in a particular wavelength range. The wavelength of the radiated far-infrared ray is controlled by changing the kinds of the organic compounds through which the far-infrared ray passes.

In this method of radiating a far-infrared ray, the far-infrared ray is most efficiently radiated by the heat generating element including the carbon fiber and the far-infrared ray passes through the organic compound to selectively radiate a far-infrared ray in a wavelength range depending on the kind of the organic compound. The wavelength range of the radiated far-infrared ray can be controlled by changing the kinds of the organic compounds.

According to the far-infrared radiators and the methods for radiating the far-infrared rays described above, a far-infrared ray in a desired wavelength range can also be radiated even at a temperature of 0° C. or lower.

This will be very helpful for giving heat to the specialized materials without heating to other environmental molecule like air.

As described above, according to the present invention, a far-infrared ray in a particular wavelength range can be selectively and efficiently radiated by selecting kinds of organic compounds. Furthermore, the wavelength range of the radiated far-infrared ray can be controlled by changing the kinds of the organic compounds.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
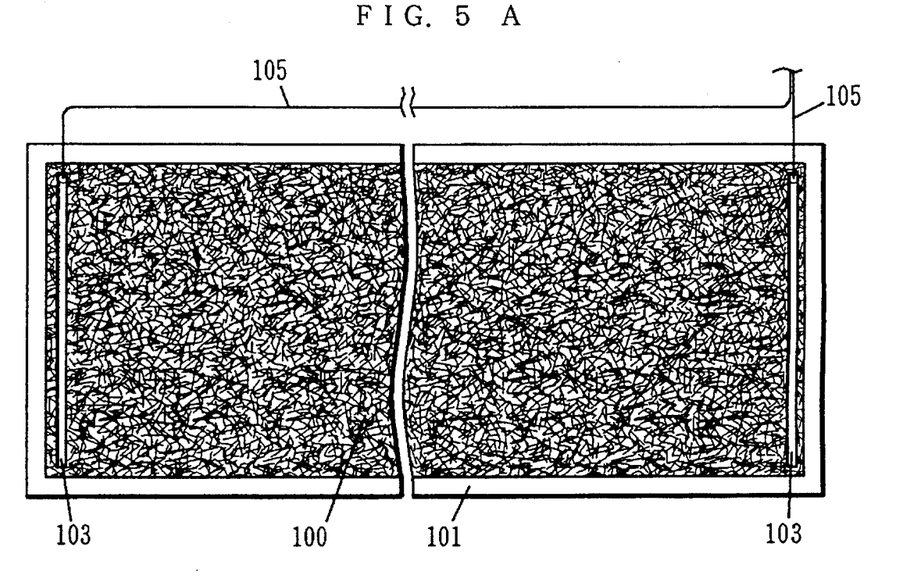
FIG. 5A is a plane view of a far-infrared radiator according to the first embodiment of the present invention.
FIG. 5B is a section view of an end portion of the far-infrared radiator according to the first embodiment of the present invention.

FIG. 5A is a plan view of a far-infrared radiator according to the first embodiment of the present invention and FIG. 5B is a section view of an end portion of the far-infrared radiator. This far-infrared radiator includes carbon fiber mixed paper 100 and organic compound layers 101 and 102 laminated on both sides of the carbon fiber mixed paper 100.

The carbon fiber mixed paper 100 is produced as described below. The pulp liquid is made by adding water to bast fiber such as the paper nulberry, the mitsumata (Edgeworthia papyrifera), or the ganpi (Wikstroemia sikokiana) which are used as materials of Japanese paper. Then, carbon fiber which is cut to about 5 mm is mixed therein and dispersed. The pulp liquid is flowed on a net for paper making to form a wet sheet. The wet sheet is mechanically dehydrated using a roll for water squeeze and dried, and then cut to predetermined dimensions. In this way, the carbon fiber mixed paper 100 of thickness about 0.2 mm is formed.

As materials of the organic compound layers 101 and 102, thermosetting resins or thermoplastic resins are used, for example. The thermosetting resins include phenol resin, melamine resin, furan resin, unsaturated polyester resin, diallyl phthalate resin, epoxy resin, silicone resin, polyimide resin, urethane resin and so forth. The thermoplastic resins include vinyl chloride resin, vinyl acetate resin, vinylidene chloride resin, polystyrene, acrylonitrile-styrene resin, acrylonitrile-butadiene-sytrene resin, methyl methacrylate resin, ethylene-vinyl acetate resin, polyamide, polyimide, polyamideimide, polyurethane, polycarbonate, polyester, nitrocellulose and so forth. Organic compounds containing heavy metal elements such as iron, copper, silver and platinum can also be used as the organic compound layers 101 and 102. As described above, as to the organic compound layers 101 and 102, any materials having absorption peaks in the wavelength range of the far-infrared rays can be used for the purpose of the present invention by evaluating the peaks.

The materials of the organic compound layers 101 and 102 are selected corresponding to the wavelength range of radiated far-infrared ray. The material of the organic compound layer 101 does not have to be the same as the material of the organic compound layer 102. Different materials may be used. In this case, far-infrared rays in different wavelength ranges are radiated from the front surface and the back surface of the far-infrared radiator.

Furthermore, the far-infrared radiator of this embodiment is used to efficiently radiate far-infrared rays in a particular wavelength range, so that thermal resistance and combustibility of the organic compound layers 101 and 102 may be left out of consideration.

Now, a method of producing the far-infrared radiator shown in FIG. 5A and FIG. 5B will be described in an example in which the organic compound layers 101 and 102 are formed of glass-epoxy resin.

Strip-like silver paste 104 is printed along opposite two sides of the carbon fiber mixed paper 100 and copper foil tape 103 with electrically conductive adhesive applied thereon is bonded on the silver paste 104. A pair of electrodes are thus formed on opposite edge portions of the carbon fiber mixed paper 100.

Furthermore, the carbon fiber mixed paper 100 is sandwiched between damp-dried glass-epoxy resin layers and hot-pressed to thermally harden the glass-epoxy resin layers. At this time, as shown in FIG. 5B, holes for provision of wire are formed in the glass-epoxy resin layers in areas at ends of the copper foil tapes 103.

As described above, the organic compound layers 101 and 102 composed of glass-epoxy resin are laminated on both sides of the carbon fiber mixed paper 100. Finally, wires 105 are connected to one end of each copper foil tape 103 by soldering or the like. A far-infrared radiator of thickness about 0.5 mm is thus produced.

If the voltage is applied to the copper foil tapes 103 of the far-infrared radiator through the wires 105, current flows to the carbon fiber dispersed in the carbon fiber mixed paper 100. The carbon fiber then generates heat and the far-infrared rays are radiated from the front side and the back side of the carbon fiber mixed paper 100. When the organic compound layers 101 and 102 absorb the far-infrared rays at the far-infrared absorption peaks, resonance is caused inside the organic compound layers 101 and 102 and far-infrared rays in a particular wavelength range is selectively radiated to the outside. That is to say, the organic compound layers 101 and 102 have ability of converting the received heating energy into the far-infrared rays in the particular wavelength range and radiating the same.

By forming the organic compound layers 101 and 102 with various organic compounds, the far-infrared rays in various wavelength ranges are efficiently radiated depending on the wavelengths of the infrared absorption peaks of those organic compounds. That is to say, the far-infrared radiator of this embodiment has wavelength selectivity which depends on the kinds of the organic compound layers 101 and 102.

Each of the organic compound layers 101 and 102 can be formed of laminated plural kinds of organic compounds as needed. In the example shown in FIG. 6, the organic compound layer 101 includes a laminate of three kinds of organic compound layers 101A, 101B and 101C.

Figure 6:
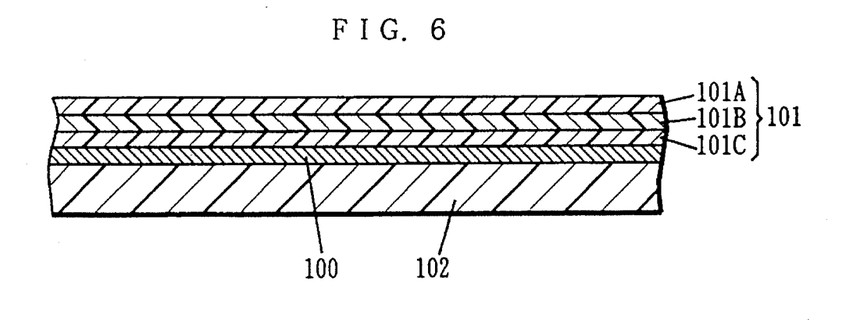
FIG. 6 is a section view showing another example of structure of an organic compound layer in the far-infrared radiator shown in FIG. 5.

In this case, the infrared absorption peaks of the three kinds of organic compounds 101A, 101B and 101C are compounded and a far-infrared ray in a wavelength range corresponding to the compounded infrared absorption peak is selectively radiated.

Figure 7:
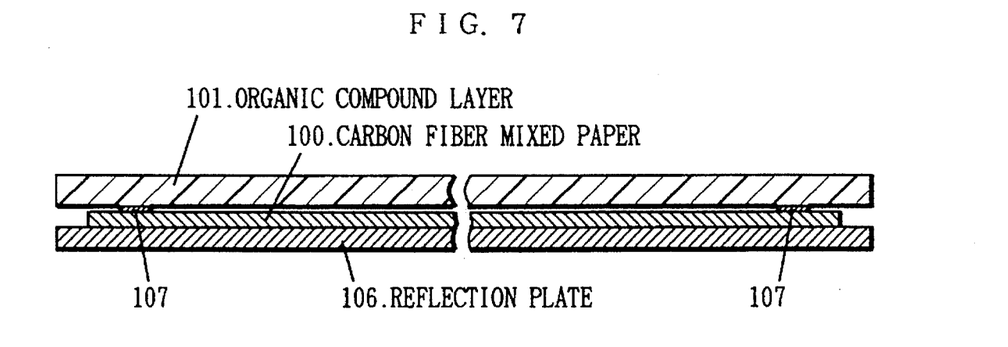
FIG. 7 is a section view of a far-infrared radiator according to the second embodiment of the present invention.

FIG. 7 is a section view of a far-infrared radiator according to the second embodiment of the present invention. This far-infrared radiator includes carbon fiber mixed paper 100, an organic compound layer 101 and a reflection plate 106.

The back surface of the carbon fiber mixed paper 100 is bonded on the reflection plate 106. A pair of electrodes 107 are formed along the opposite two sides on the front surface of the carbon fiber mixed paper 100. The organic compound layer 101 is exchangeably provided on the carbon fiber mixed paper 100.

The carbon fiber mixed paper 100 and the organic compound 101 are the same as the carbon fiber mixed paper 100 and the organic compound layer 101 in the first embodiment, respectively. The reflection plate 106 is formed of a metal plate such as aluminum, copper, silver and gold, or a metal coated plate. These metals have reflectivity to almost 100% in the wavelength range of the far-infrared ray as shown in FIG. 4. Accordingly, most of all the far-infrared rays radiated from the back surface of the carbon fiber mixed paper 100 are reflected in the direction to the organic compound layer 101 by the reflection plate 106. This improves the efficiency of radiation of the far-infrared rays.

In the far-infrared radiator according to this embodiment, the wavelength range of the far-infrared ray to be radiated can be easily controlled by changing the organic compound layer 101 for an organic compound made of another material.

Figure 8:
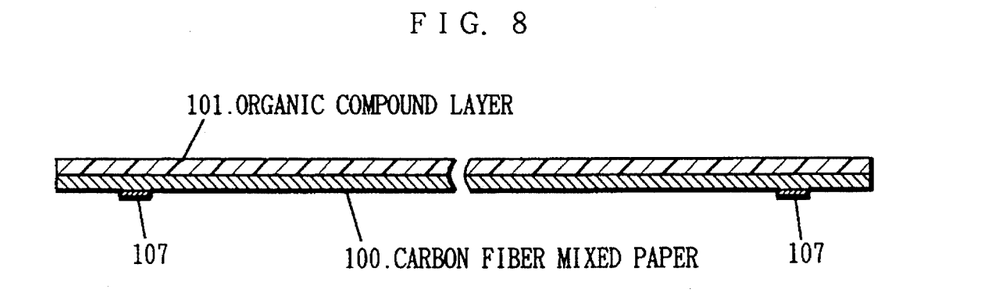
FIG. 8 is a section view of a far-infrared radiator according to the third embodiment of the present invention.

FIG. 8 is a section view of a far-infrared radiator according to the third embodiment of the present invention. This far-infrared radiator includes carbon fiber mixed paper 100 and an organic compound layer 101 coated on the surface of the carbon fiber mixed paper 100.

An organic compound which is dissolvable in a solvent is used as the organic compound layer 101. This organic compound layer 101 is formed by applying an organic compound dissolved in a solvent on the surface of the carbon fiber mixed paper 100. A pair of electrodes 107 are formed along the opposite two sides on the back surface of the carbon fiber mixed paper 100.

In the far-infrared radiator of this embodiment, the far-infrared rays in a wavelength range depending on the kind of the organic compound 101 coated on the surface of the carbon fiber mixed paper 100 are selectively and efficiently radiated.

Figure 9:
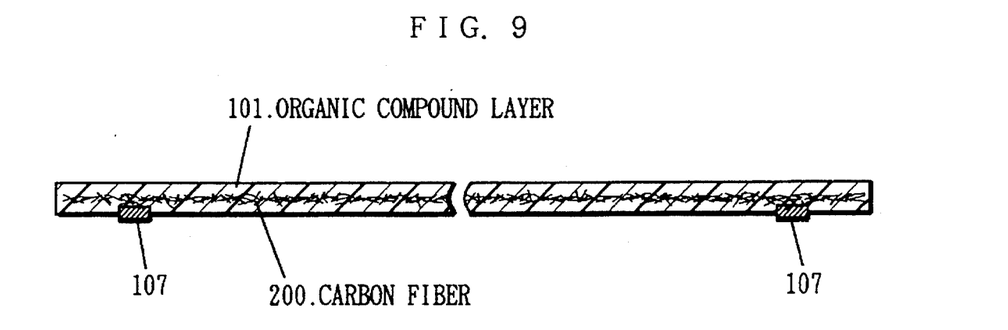
FIG. 9 is a section view of a far-infrared radiator according to the fourth embodiment of the present invention.

FIG. 9 is a section view of a far-infrared radiator according to the fourth embodiment of the present invention. This far-infrared radiator includes an organic compound layer 101 and carbon fiber 200 mixed and dispersed in the organic compound layer 101. This far-infrared radiator is produced by mixing and dispersing the carbon fiber in an organic compound in a liquid state and forming the organic compound into sheet shape. A pair of electrodes 107 are provided on the back surface of the organic compound layer 101 in contact with the carbon fiber 20.

Also in the far-infrared radiator of this embodiment, the far-infrared rays in a wavelength range which depends on the kind of the organic compound layer 101 is selectively and efficiently radiated.

Figure 10:
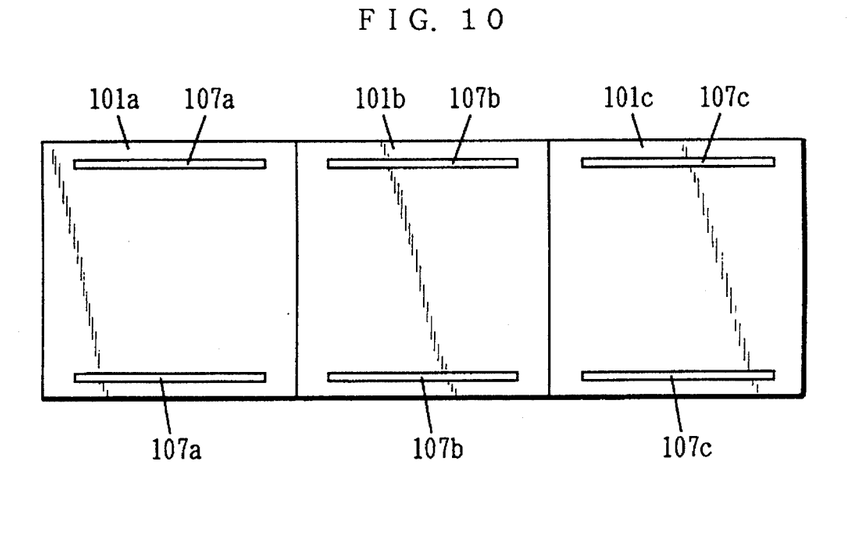
FIG. 10 is a plane view of a far-infrared radiator according to the fifth embodiment of the present invention.
Figure 11:
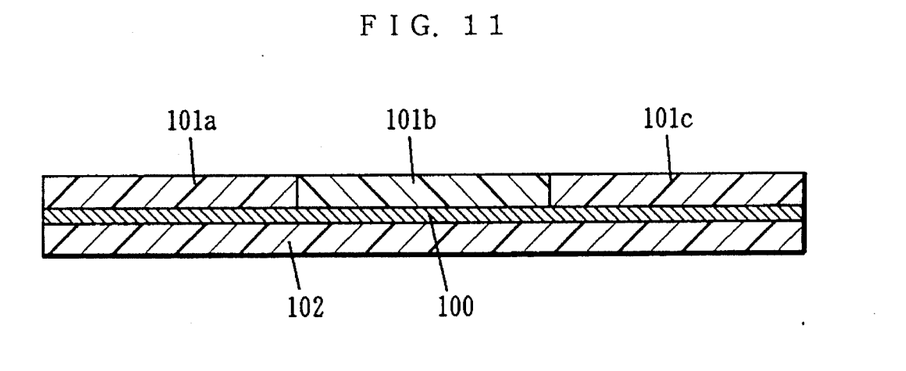
FIG. 11 is a section view of the far-infrared radiator shown in FIG. 10.

FIG. 10 is a plan view of a far-infrared radiator according to the fifth embodiment of the present invention and FIG. 11 is a section view of the far-infrared radiator. This far-infrared radiator includes carbon fiber mixed paper 100, three kinds of organic compound layers 101a, 101b and 101c laminated on the surface of the carbon fiber mixed paper 100 and an organic compound layer 102 laminated on the back surface of the carbon fiber mixed paper 100. The organic compound layers 101a, 101b and 101c are formed of different materials.

On the surface of the carbon fiber mixed paper 100, a pair of electrodes 107a are formed in the area corresponding to the organic compound layer 101a, a pair of electrodes 107b are formed in the area corresponding to the organic compound layer 101b and a pair of electrodes 107c are formed in the area corresponding to the organic compound layer 101c.

In the far-infrared radiator of this embodiment, by applying current to one of the three pairs of electrodes 107a, 107b and 107c, the far-infrared rays in a wavelength range which depends on the kind of the corresponding organic compound layer is selectively and efficiently radiated.

The far-infrared radiators of the above-described embodiments can be used for medical treatments of various parts of a living body. When the wavelength range of far-infrared rays to be radiated differs depending on the position on the living body or the contents of the treatments, the kinds of the organic compound layers can be selected so that a far-infrared ray in a wavelength range which is the most appropriate to that part or the contents of the treatment is radiated. Thus, individual parts of the living body can be treated with the far-infrared rays in the most appropriate wavelength range.

Furthermore, the far-infrared radiators of the above-described embodiments can be effectively used for radiant heating. In the conventional study of sheet-like heat generators, attentions have been paid only to the temperature rise of the sheet-like heat generator itself. However, the radiant energy radiated from the far-infrared radiator goes straight through the air without temperature rise to reach an object, where most of it is absorbed. This activates the motion of the molecules inside the object to increase the temperature. In this way, the object is directly heated by the radiated far-infrared rays in heating using the far-infrared radiator. Accordingly, the far-infrared radiator can work not only on the living bodies but also on all the substances which require far-infrared radiation.

Figure 12:
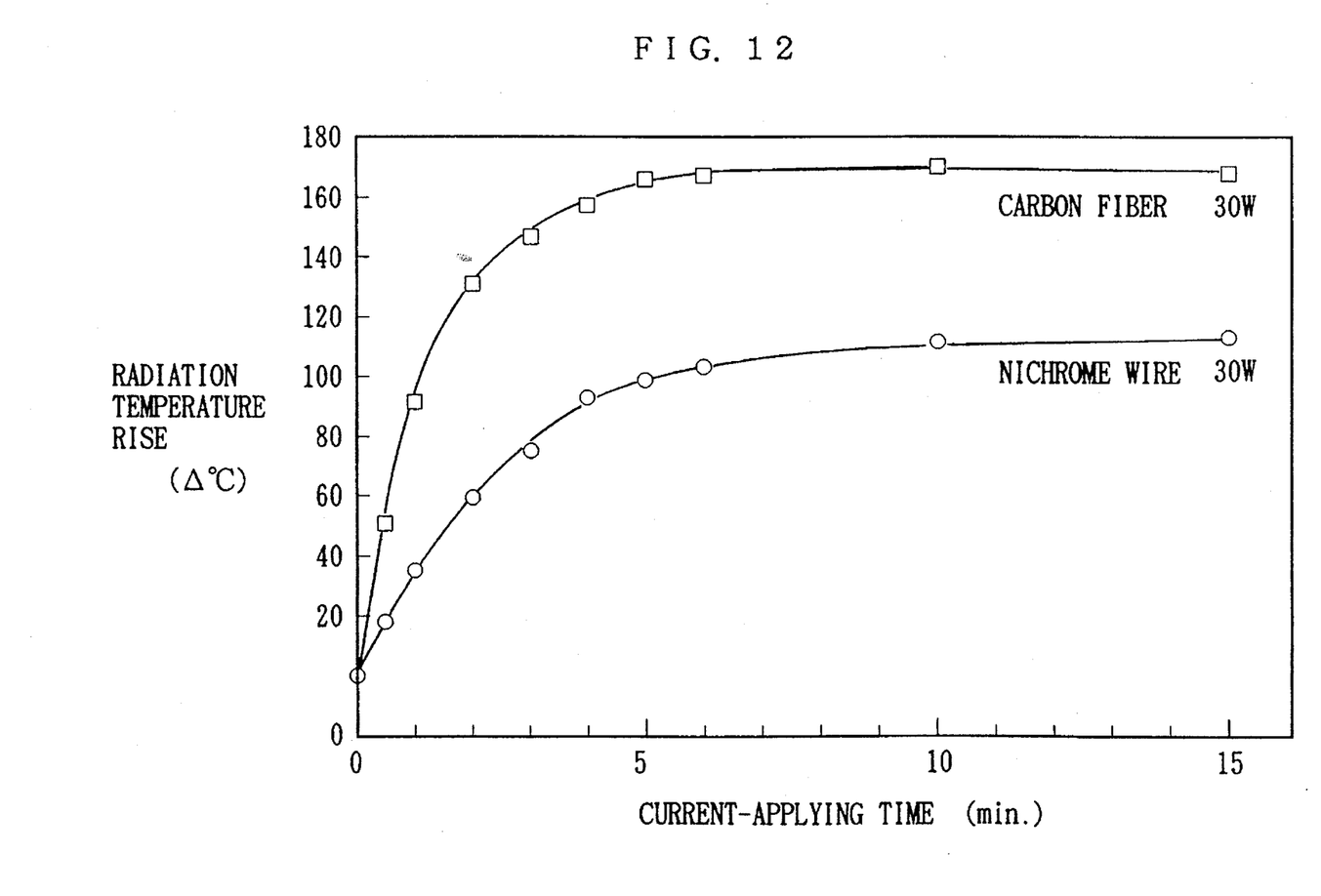
FIG. 12 is a diagram showing temperature rises of a heat generating element using carbon fiber and a heat generating element using Nichrome wire.

From the reasons mentioned above, the temperature rise of the heat generator itself is not a problem but the increase of the radiation temperature is important in heating by the far-infrared radiation. FIG. 12 shows the radiation temperature rise of a heat generator formed of Nichrome wire and the radiation temperature rise of a heat generator including carbon fiber. As can be clearly seen from FIG. 12, the radiation temperature rise of the heat generator formed of the carbon fiber is larger than the radiation temperature rise of the heat generator formed of the Nichrome wire at the same consumption power, and the increasing rate thereof is also larger. Accordingly, a time needed to achieve desired radiation is considerably shortened.

Accordingly, efficient heating is enabled by using the far-infrared radiators of the above-described embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A far-infrared radiator, comprising:

a far-infrared radiation heat generating element including carbon fiber mixed in paper; and a filter means including a laminate of plural kinds of resin layers arranged on the same plane, said laminate laminated on said paper.

2. A far-infrared radiator, comprising:

a far-infrared radiation heat generating element including carbon fiber mixed paper and electrodes provided on said carbon fiber mixed paper; and a wavelength selecting means including a resin layer laminated on said carbon fiber mixed paper wherein said resin layer includes plural kinds of resin layers arranged on the same plane for absorbing a far-infrared ray at a particular wavelength in a far-infrared ray radiated from said far-infrared radiation heat generating element and selectively radiating a far-infrared ray in a particular wavelength range.

3. A method of radiating far-infrared rays in a particular wavelength range, comprising the steps of radiating far-infrared rays over a full far-infrared wavelength range by a heat generating element including carbon fiber, and selecting an organic compound and causing the selected organic compound to absorb the radiated far-infrared rays and to resonance-radiate far-infrared rays in a particular wavelength range which depends on the organic compound selected.

4. The method of radiating far-infrared rays according to claim 3, wherein said heat generating element includes carbon fiber mixed paper.

5. The method of radiating far-infrared rays according to claim 4, wherein said selected organic compound includes a resin layer laminated on said carbon fiber mixed paper.

6. The method of radiating far-infrared rays according to claim 5, wherein said resin layer includes a laminate of plural kinds of resin layers.

7. The method of radiating far-infrared rays according to claim 5, wherein said resin layer includes plural kinds of resin layers arranged on the same plane.

8. The method of radiating far-infrared rays according to claim 3, wherein said organic compound include a resin layer forming said carbon fiber into sheet shape.

9. The method of radiating far-infrared rays according to claim 8, wherein said resin layer includes a laminate of a plurality of kinds of resin layers.

10. The method of radiating far-infrared rays according to claim 8, wherein said resin layer includes a plurality of kinds of resin layers arranged on the same plane.

11. A method of radiating far-infrared rays in a particular wavelength range, comprising the steps of radiating far-infrared rays having all wavelengths in a far-infrared range by a heat generating element including carbon fiber, and converting the radiated far-infrared rays having all wavelengths in the far-infrared range into far-infrared rays having a particular wavelength by selecting an organic compound and causing the selected organic compound to absorb the radiated far-infrared rays and causing the absorbed far-infrared rays to resonate at a particular wavelength which depends on the organic compound selected.

12. The method of radiating far-infrared rays according to claim 11, wherein said heat generating element includes carbon fiber mixed paper.

13. The method of radiating far-infrared rays according to claim 11, wherein said selected organic compound includes a resin layer laminated on said carbon fiber mixed paper.

14. The method of radiating far-infrared rays according to claim 12, wherein said resin layer includes a laminate of plural kinds of resin layers.

15. The method of radiating far-infrared rays according to claim 12, wherein said resin layer includes plural kinds of resin layers arranged on the same plane.

16. The method of radiating far-infrared rays according to claim 15, further comprising the step of changing the kinds of the organic compounds to be selected for absorbing the resonance-radiating far-infrared rays in a particular wavelength range.

17. A method of radiating far-infrared rays in a particular wavelength range, comprising the steps of radiating far-infrared rays over a full far-infrared wavelength range by a heat generating element including carbon fiber, selecting one or more kinds of organic compounds out of a plurality of kinds of organic compounds, and causing said selected one or more kinds of organic compounds to absorb the radiated far-infrared rays and to resonance-radiate far-infrared rays in a particular wavelength range which depends on the kinds of organic compounds selected.

18. A method or radiating far-infrared rays in a particular wavelength range, comprising the steps of radiating far-infrared rays having all wavelengths in a far-infrared range by a heat generating element including carbon fiber, selecting one or more kinds of organic compounds out of a plurality of kinds of organic compounds and converting the radiated far-infrared rays having all wavelengths in the far-infrared range into far-infrared rays having a particular wavelength by causing said selected one or more kinds of organic compounds to absorb the radiated far-infrared rays and causing the absorbed far-infrared rays to resonate at a particular wavelength which depends on the kinds of organic compounds selected.

19. A far-infrared radiator, comprising:
 a far-infrared radiation element including carbon fiber mixed paper for radiating far-infrared rays over a full far-infrared wavelength range; and
 a resonance radiation element including selected one or more organic compounds for absorbing the radiated far-infrared rays from said far-infrared radiation element and resonance-radiating far-infrared rays in a particular wavelength range which depends on the kinds of organic compounds selected.

20. The far-infrared radiator of claim 19 wherein said organic compounds further comprises thermosetting resins selected from the group consisting of phenol resin, melamine resin, furan resin, unsaturated polyester resin, diallyl phthalate resin, epoxy resin, silicone resin and polyamide resin, and thermoplastic resins selected from the group consisting of vinyl acetate resin, vinylidene chloride resin, polystyrene, acrylonitrile-styrene resin, acrylonitrile-butadiene-sytrene resin, methyl methacrylate resin, ethylene-vinyl acetate resin, polyamide, polyimide, polyamideimide, polycarbonate, polyester and nitrocellulose.

21. A far-infrared radiator, comprising:
 a far-infrared radiation element including carbon fiber mixed paper for radiating far-infrared rays having all wavelengths in a far-infrared range; and
 a frequency conversion element including selected one or more organic compounds for converting the radiated far-infrared rays having all wavelengths in the far-infrared range into far-infrared rays having a particular wavelength by absorbing the radiated far-infrared rays from said far-infrared radiation element and causing resonance at a particular wavelength which depends on the kinds of organic compounds selected.

22. The far-infrared radiator of claim 21 wherein said organic compounds further comprises thermosetting resins selected from the group consisting of phenol resin, melamine resin, furan resin, unsaturated polyester resin, diallyl phthalate resin, epoxy resin, silicone resin and polyamide resin, and thermoplastic resins selected from the group consisting of vinyl acetate resin, vinylidene chloride resin, polystyrene, acrylonitrile-styrene resin, acrylonitrile-butadiene-sytrene resin, methyl methacrylate resin, ethylene-vinyl acetate resin, polyamide, polyimide, polyamideimide, polycarbonate, polyester and nitrocellulose.

* * * * *